United States Patent [19]
Fukatani

[11] Patent Number: 5,799,745
[45] Date of Patent: Sep. 1, 1998

[54] DEVICE FOR STABILIZING VEHICLE ATTITUDE IN TERMINAL PORTION OF COUNTERSTEERING STATE BY REDUCING VEHICLE YAW MOMENT PRODUCED BY YAW MOMENT CONTROL MECHANISM

[75] Inventor: Katsumi Fukatani, Susono, Japan

[73] Assignee: Toyota Jidosha Kabushiki Kaisha, Toyota, Japan

[21] Appl. No.: 659,886

[22] Filed: Jun. 7, 1996

[30] Foreign Application Priority Data

Jun. 9, 1995 [JP] Japan ................ 7-142970

[51] Int. Cl.$^6$ ................ B60K 26/00; B62D 6/00
[52] U.S. Cl. ................ 180/410; 180/412; 364/424.051
[58] Field of Search ................ 180/408, 410, 180/412, 413, 414, 415; 364/424.051

[56] References Cited

U.S. PATENT DOCUMENTS

| | | | |
|---|---|---|---|
| 4,679,808 | 7/1987 | Ito et al. | 180/408 |
| 5,341,294 | 8/1994 | Kanazawa et al. | 364/424.051 |
| 5,365,440 | 11/1994 | Abe et al. | 364/424.051 |
| 5,446,657 | 8/1995 | Ikeda et al. | 364/424.051 |
| 5,502,639 | 3/1996 | Fukunaga et al. | 364/424.051 |
| 5,561,603 | 10/1996 | Goto | 364/424.051 |

FOREIGN PATENT DOCUMENTS 6-270828  9/1994  Japan.

*Primary Examiner*—Scott Cummings
*Attorney, Agent, or Firm*—Cushman Darby & Cushman IP Group of Pillsbury Madison & Sutro LLP

[57] ABSTRACT

A vehicle attitude control device including a yaw moment control mechanism for giving a yaw moment to the vehicle and controlling the yaw moment, and a controller for controlling the yaw moment control mechanism in a normal target follow-up control mode so that the actual yaw rate detected by a yaw rate sensor coincides with a target value determined on the basis of an angle of rotation of a steering wheel detected by a steering wheel angle sensor, and wherein a yaw moment reducing device is provided for reducing the yaw moment to be given to the vehicle by the yaw moment control mechanism, to a reduced value smaller than a normal value to which the yaw moment is controlled in the normal target follow-up control mode. The yaw moment reducing device is operated in at least a second phase of a countersteering period following a first phase which is initiated by vehicle operator's countersteering manipulation of the steering wheel upon slipping of rear wheels of the vehicle during vehicle turning outwardly of the turning direction so as to countersteer the vehicle.

11 Claims, 10 Drawing Sheets

| NORMAL STATE (MODE = 0) | COUNTERSTEERING STATE | | NORMAL STATE (MODE = 0) |
|---|---|---|---|
| | FIRST PHASE (MODE = 1, −1) | SECOND PHASE (MODE = 2, −2) | |
| NORMAL TARGET FOLLOW-UP CONTROL MODE | FIRST-PHASE COUNTERSTEERING CONTROL MODE | SECOND-PHASE COUNTERSTEERING CONTROL MODE | NORMAL TARGET FOLLOW-UP CONTROL MODE |
| | − PROPORTIONING CONTROL<br>− REAR STEERING ANGLE HOLDING CONTROL<br>− REAR STEERING ANGLE ZEROING CONTROL<br>− REAR WHEEL SLIP ANGLE ZEROING CONTROL<br>⋮ | − PROPORTIONING CONTROL<br>− PROPORTIONING CONTROL<br>− REAR STEERING ANGLE ZEROING CONTROL<br>− REAR WHEEL SLIP ANGLE ZEROING CONTROL<br>⋮ | |

TIME →

FIG. 6

| MODES | DESCRIPTION | MODES ESTABLISHED IN |
|---|---|---|
| 2 | CCW TURN | SECOND PHASE OF COUNTERSTEERING PERIOD |
| 1 | | FIRST PHASE OF COUNTERSTEERING PERIOD |
| 0 | NORMAL | VEHICLE RUNNING WITH HIGH ROAD SURFACE GRIPPING |
| −1 | | FIRST PHASE OF COUNTERSTEERING PERIOD |
| −2 | CW TURN | SECOND PHASE OF COUNTERSTEERING PERIOD |

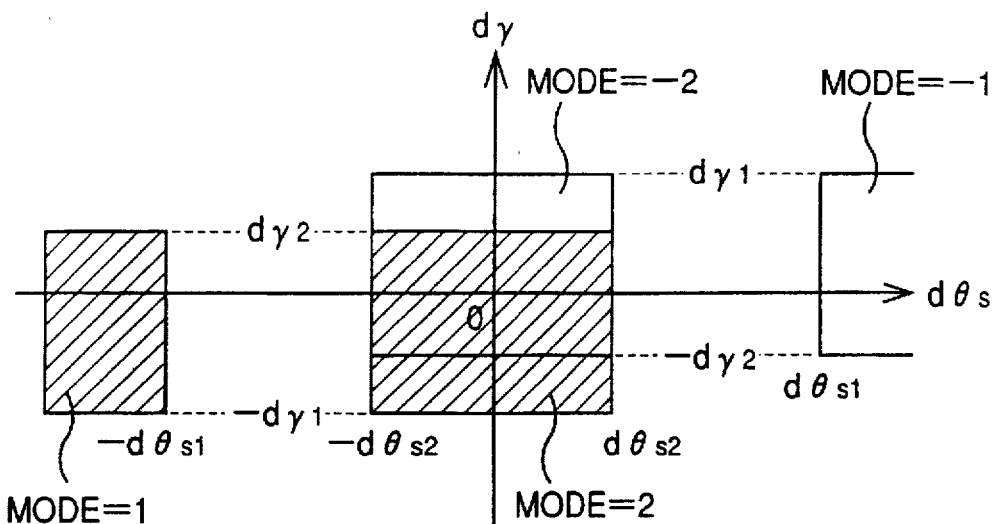

| NORMAL STATE (MODE = 0) | COUNTERSTEERING STATE | | NORMAL STATE (MODE = 0) |
|---|---|---|---|
| | FIRST PHASE (MODE = 1, −1) | SECOND PHASE (MODE = 2, −2) | |
| NORMAL TARGET FOLLOW-UP CONTROL MODE | FIRST-PHASE COUNTERSTEERING CONTROL MODE | SECOND-PHASE COUNTERSTEERING CONTROL MODE | NORMAL TARGET FOLLOW-UP CONTROL MODE |
| | − PROPORTIONING CONTROL<br>− REAR STEERING ANGLE HOLDING CONTROL<br>− REAR STEERING ANGLE ZEROING CONTROL<br>− REAR WHEEL SLIP ANGLE ZEROING CONTROL<br>⋮ | − PROPORTIONING CONTROL<br>− PROPORTIONING CONTROL<br>− REAR STEERING ANGLE ZEROING CONTROL<br>− REAR WHEEL SLIP ANGLE ZEROING CONTROL<br>⋮ | |

TIME →

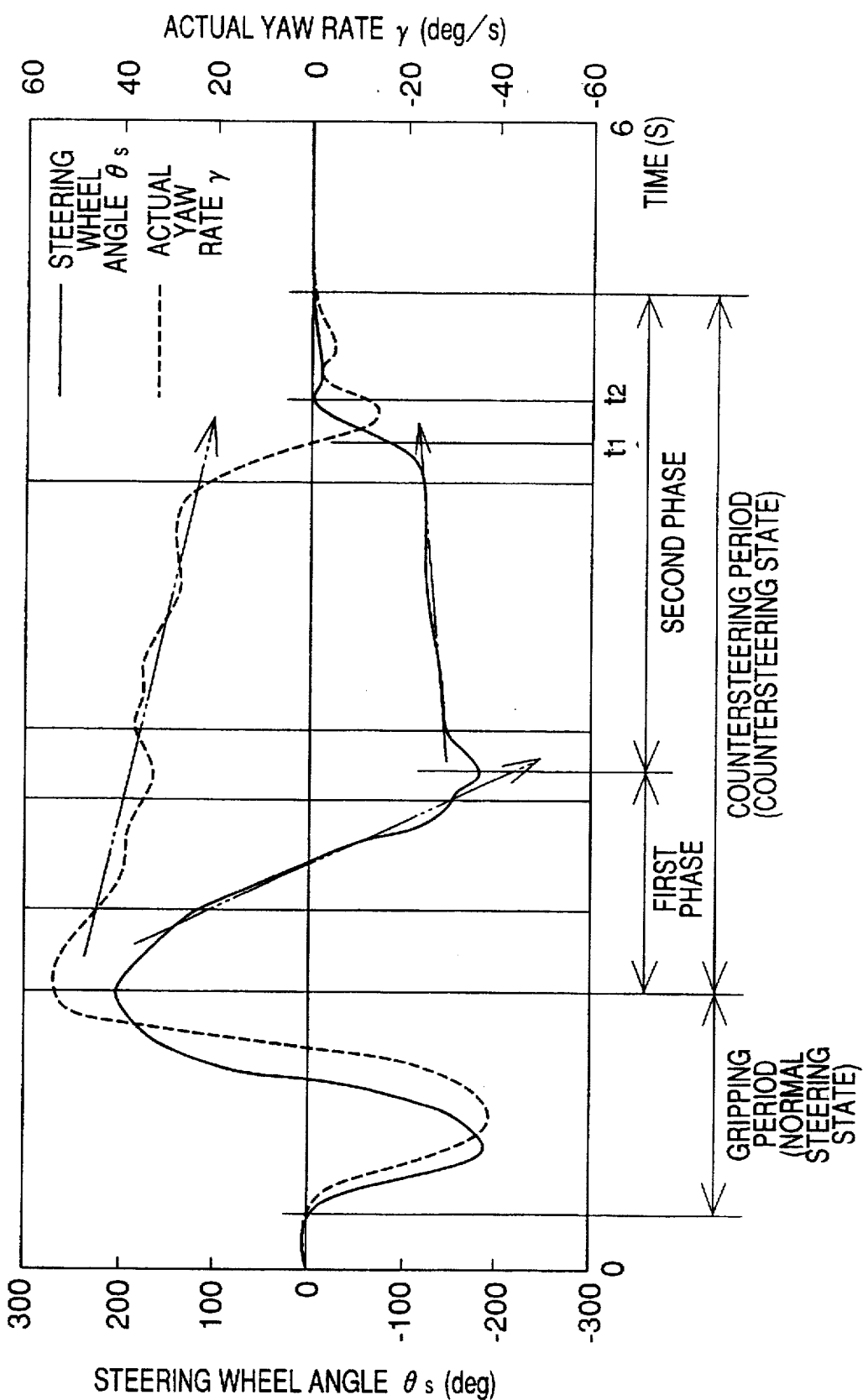

5,799,745

DEVICE FOR STABILIZING VEHICLE ATTITUDE IN TERMINAL PORTION OF COUNTERSTEERING STATE BY REDUCING VEHICLE YAW MOMENT PRODUCED BY YAW MOMENT CONTROL MECHANISM

BACKGROUND OF THE INVENTION

1. Field of the Invention

The present invention relates in general to a vehicle attitude control device for controlling the attitude of a motor vehicle by controlling the yaw moment of the vehicle, and more particularly to techniques for improving the attitude stability of the vehicle upon termination of countersteering manipulation of the steering wheel of the vehicle.

2. Discussion of the Related Art

An example of a known vehicle attitude control device includes (a) a steering wheel angle sensor for detecting a rotation angle of a steering wheel of a motor vehicle which is operated by a vehicle operator to steer front wheels of the vehicle, (b) a yaw rate sensor for detecting an actual yaw rate of the vehicle; (c) a yaw moment control mechanism for generating and controlling a yaw moment of the vehicle; and (d) a controller adapted to effect a target follow-up control for controlling the yaw moment control mechanism so that the actual yaw rate detected by the yaw rate sensor coincides with a target yaw rate determined on the basis of the steering wheel rotation angle detected by the steering wheel angle sensor.

In the vehicle attitude control device of the type indicated above, a control system whose input is the steering wheel rotation angle and whose output is the target yaw rate generally has a first-order time lag, and uses a time constant $\tau$ in a transfer function describing this first-order time lag control system. This time constant t is a fixed constant value. On the other hand, JP-A-6-270828 discloses a vehicle attitude control device in which the time constant $\tau$ is a variable which is relatively small when the steering wheel which has been rotated to a given position in one direction and held at that position for some time is further rotated in the same direction, and is relatively large when the steering wheel which has been rotated in one direction and held at the given position is rotated in the reverse direction. The vehicle attitude control device disclosed in this publication is adapted to control the rear steering angle (steering angle of the rear wheels) so that the actual yaw rate of the vehicle coincides with the target yaw rate. When the rotation angle of the steering wheel is increased, the target yaw rate and therefore the rear steering angle will change in quick response to a rapid increase of the steering wheel rotation angle, so that the vehicle can turn with a high response to the operator's manipulation of the steering wheel to turn the vehicle. When the rotation angle of the steering wheel is reduced by rotating the steering wheel in the direction opposite to the direction in which the steering wheel has first been rotated, the response of the target yaw rate and the rear steering angle is relatively low so that the vehicle attitude can be rapidly stabilized or the actual yaw rate of the vehicle can be stabilized with a high response to the operator's manipulation of the steering wheel to stabilize the vehicle attitude.

However, the conventional vehicle attitude control device tends to suffer from a problem that the vehicle attitude cannot be rapidly stabilized upon termination or during a terminal portion of a countersteering manipulation of the steering wheel. This problem is encountered irrespective of whether the time constant $\tau$ indicated above is constant or variable. There will be described in detail this problem of the conventional attitude control device where the time constant $\tau$ in the first-order time lag control system is constant and where the target follow-up control is effected to control the rear steering angle as known in the art.

Referring to the graph of FIG. 12 which indicates, by way of example, changes of the steering wheel rotation angle and the actual yaw rate of the vehicle when the steering angle is manipulated to countersteer the vehicle, these changes take place when a motor vehicle V is steered as indicated by arrows in FIG. 13, in a steering test in which the steering wheel is first rapidly rotated in the counterclockwise direction so as to clear an obstacle B in front of the vehicle V, and is then rotated in the clockwise direction to the neutral position for straight-forward running of the vehicle again.

As indicated in the graph of FIG. 12, the vehicle first enters a "gripping period" during which the tires of the vehicle stably grip the road surface without slipping therebetween and during which the running direction of the vehicle V relatively accurately corresponds to the rotation angle or angular position of the steering wheel, so that the vehicle can turn so as to clear the obstacle B. In this gripping period, the actual yaw rate of the vehicle accurately corresponds to the rotation angle of the steering wheel. The gripping period is defined as a period during which the steering wheel is in a normal steering state.

The gripping period is followed by a "countersteering period" which is initiated by a vehicle operator's manipulation to rotate the steering wheel to steer the front steering wheels so as to change the orientation of the vehicle when the rear wheels laterally slip on the road surface outwardly of the turning direction of the vehicle. As well known in the art, this "countersteering" of the steering wheel is effected to change the steering angle of the front steering wheels so that the front wheels are oriented outwards with respect to the turning direction of the vehicle. Where the vehicle is turning counterclockwise as indicated in FIGS. 14A and 14B, for example, the front steering wheels are countersteered rightwards with respect to the vehicle turning direction, as indicated in FIGS. 14C and 14D. The countersteering period consists of a first or former phase and a second or latter phase which are distinguished from each other depending upon the operating state of the steering wheel, as indicated in FIG. 12. The countersteering period is defined as a period during which the steering wheel is in a countersteering state.

The first or former phase of the countersteering period is generally initiated by initiation of rotation of the steering wheel from one of two angular positions thereof for clockwise and counterclockwise turns of the vehicle toward the other angular position through the neutral position. This rotation of the steering wheel in the first phase of the countersteering period is effected at a higher rate than in normal steering operation of the steering wheel. In the first phase of the countersteering period, the force by which the rear tires of the vehicle grip the road surface begins to decrease with a result of initiation of spinning of the vehicle inwardly of the turning direction. Consequently, the vehicle operator tends to rotate the steering wheel toward its neutral position at a higher rate than in the normal steering operation, for eliminating the spinning tendency of the vehicle as soon as possible. However, the gripping force of the rear tires will not sufficiently increase and the spinning tendency will not be eliminated, by the time when the steering wheel has been rotated to the neutral position. Accordingly, the actual yaw rate of the vehicle will not be rapidly zeroed in quick response to the decrease in the angle of the steering wheel, but will only slowly decrease toward zero, as indicated by broken line in FIG. 12. Consequently, the actual yaw rate γ becomes larger than a target yaw rate γd determined on the basis of the rotation angle of the steering wheel, as indicated in FIGS. 14A and 14B. Therefore, the controller of the vehicle attitude control device controls the yaw moment control mechanism so that the rear wheels are steered so as to produce a yaw moment CYM suitable for coincidence of the actual yaw rate γ with the target value γd. Namely, the yaw moment CYM necessary to eliminate a difference or error between the actual yaw rate γ and the target yaw rate γd is produced by changing the rear steering angle by the yaw moment control mechanism under the control of the controller.

Where the spinning tendency of the vehicle has not been sufficiently eliminated by the relatively rapid return of the steering wheel to its neutral position, the vehicle operator continues to rotate the steering wheel in the same direction at a relatively high rate (as indicated by solid line in FIG. 12) to the angular position which causes the front steering wheels to be oriented outwardly of the turning direction of the vehicle, as indicated in FIG. 14B. As a result, the sign of the actual yaw rate γ becomes opposite to the sign of the target yaw rate γd determined on the basis of the steering wheel angle, as also indicated in FIGS. 14C and 14D, so that the rear wheels are steered so that the rear wheels are oriented further inwardly of the vehicle turning direction, whereby the yaw moment CYM to be produced by the yaw moment control mechanism is further increased.

The second or latter phase of the countersteering period is initiated when the rotation of the steering wheel in the above-indicated direction is stopped. In this second phase of the countersteering period, the vehicle operator usually hold the steering wheel at the above-indicated angular position, as indicated by the solid line in FIG. 12. While the steering wheel is held at this angular position, the actual yaw rate of the vehicle only slowly decreases toward zero, as indicated by the broken line in FIG. 12. In the meantime, the gripping force of the rear tires gradually increases to the normal value. Consequently, the actual yaw rate γ begins to relatively rapidly decrease toward zero and is eventually zeroed at point of time t1 indicated in FIG. 12. On the other hand, the steering wheel rotation angle is zeroed or the steering wheel is returned to the neutral position at point of time t2, a given time after the actual yaw rate is zeroed. In other words, the zeroing of the steering wheel rotation angle is delayed with respect to the zeroing of the actual yaw rate γ. This delay is caused not because the vehicle operator purposely delays the zeroing of the steering wheel rotation angle, but is caused because the operator cannot return the steering wheel to the neutral position in quick response to the zeroing of the actual yaw rate γ.

Accordingly, even after the zeroing of the actual yaw rate γ, the controller continues to control the yaw moment control mechanism for performing the target follow-up control according to the steering wheel rotation angle which has not yet been zeroed. Consequently, the rear wheels are steered on the basis of the steering wheel rotation angle such that the rear wheels are oriented in substantially the same direction as the vehicle turning direction as indicated in FIGS. 14E and 14F, whereby the vehicle is given an unnecessary yaw moment CYM by the yaw moment control mechanism, even where the actual yaw moment γ is substantially zero. As a result, the vehicle suffers from unexpected yawing in the opposite direction, in the terminal portion of the countersteering period. That is, the direction of the actual yaw rate γ in the terminal portion of the countersteering period is reversed due to the yaw moment CYM which is given by the yaw moment control mechanism because the steering wheel is returned to the neutral position even after the actual yaw rate γ is zeroed. Therefore, the vehicle attitude cannot be rapidly stabilized at or near the end of the countersteering period.

As described above, the countersteering action of the steering wheel by the vehicle operator generally causes a delay of the zeroing of the steering wheel rotation angle with respect to the zeroing of the actual yaw rate of the vehicle. Accordingly, the yaw moment CYM is produced by the yaw moment control mechanism even after the actual yaw rate γ is zeroed, in the conventional vehicle attitude control device adapted to control the yaw moment control mechanism on the basis of the rotation angle of the steering wheel even in the second or latter phase of the countersteering period. Thus, the conventional device is not capable of rapidly stabilizing the vehicle attitude upon termination or during the terminal portion of the countersteering manipulation of the steering wheel.

While the problem of the conventional vehicle attitude control device wherein the time constant τ is constant has been described above, the same problem is also encountered in the conventional device wherein the time constant τ is variable as disclosed in the above-identified publication JP-A-6-270828. The problem is more serious in the device of this publication since the time constant τ is made relatively large upon decreasing of the steering wheel rotation angle from an angular position to the neutral position, whereby the yaw moment control mechanism for controlling the rear steering angle is not sufficiently highly responsive to a decrease in the rotation angle of the steering wheel, so that the rear wheels are prevented from returning to the neutral position for a relatively long period corresponding to the relatively large time constant τ, even after the zeroing of the steering wheel rotation angle.

According to the definition of the first phase of the countersteering period in the above explanation, the first phase is initiated at a point of time at which the steering wheel has been rotated in one direction to an angular position corresponding to the desired vehicle turning direction and at which the rotation of the steering wheel in the other direction toward the neutral position is initiated by the vehicle operator in response to the development of a spinning tendency of the vehicle. However, the first phase may be defined to be initiated at a point which is subsequent to the above-identified point of time and at which the steering wheel has been rotated in the other direction to a given angular position which does not corresponds to the actual vehicle turning direction.

SUMMARY OF THE INVENTION

It is therefore an object of the present invention to provide a vehicle attitude control device which permits a higher rate of stabilization of the vehicle attitude during a terminal portion of a countersteering manipulation of the steering wheel, by reducing an amount of a yaw moment to be given to the vehicle by the yaw moment control mechanism, in at least the second or latter phase of the countersteering period, as compared with an amount of a yaw moment to be produced at the other opportunities in the normal target follow-up control mode.

The above object may be achieved according to the principle of the present invention, which provides a vehicle attitude control device comprising a steering wheel angle sensor for detecting a rotation angle of a steering wheel which is operated by an operator of the vehicle to steer front wheels of the vehicle, a yaw rate sensor for detecting an actual value of a yaw rate of the vehicle, a yaw moment control mechanism for giving a yaw moment to the vehicle and controlling the yaw moment, and a controller for controlling the yaw moment control mechanism in a normal target follow-up control mode so that the actual value of the yaw rate detected by the yaw rate sensor coincides with a target value of the yaw rate which is determined on the basis of the rotation angle of the steering wheel detected by the steering wheel angle sensor, the vehicle attitude control device being characterized by further comprising yaw moment reducing means for reducing the yaw moment to be given to the vehicle by the yaw moment control mechanism, to a reduced value smaller than a normal value to which the yaw moment is controlled in the normal target follow-up control mode under the control of the controller. The yaw moment reducing means is operated in at least a second phase of a countersteering period following a first phase of the countersteering period. The countersteering period is initiated by countersteering manipulation of the steering wheel by the operator upon slipping of rear wheels of the vehicle during turning of the vehicle outwardly of a direction of the vehicle turning so as to countersteer the vehicle. The countersteering manipulation includes a rotation of the steering wheel in the first phase so that the front wheels are oriented outwards with respect to the turning direction of the vehicle, and a rotation of the steering wheel toward a neutral position thereof in the second phase.

The term "countersteering period" is generally defined as a period consisting of the first phase in which the steering wheel is rotated by the vehicle operator at a higher rate than in a normal steering operation, to orient the front wheels outwards with respect to the turning direction of the vehicle, and the second phase in which the steering wheel is held at an angular position thereof close to that at the end of the first phase, and is then restored to its neutral position. However, the term may be defined otherwise.

The "rotation of the steering wheel toward a neutral position thereof" may be interpreted to mean the rotation of the steering wheel to the neutral position or an angular position thereof substantially equal to or close to the neutral position.

In the second phase of the countersteering period or state of the steering wheel, the actual yaw rate of the vehicle generally tends to be zeroed before the rotation angle of the steering wheel is zeroed. If the yaw moment control mechanism was controlled to control the vehicle attitude in the normal normal target follow-up control mode on the basis of the rotation angle of the steering wheel even in the second phase of the countersteering period, the vehicle would be given an unnecessary yaw moment by the yaw moment control mechanism even where the actual yaw moment is substantially zero, and the vehicle would suffer from a yawing action in the direction opposite to the direction of the previous yawing action.

In the vehicle attitude control device of the present invention constructed as described above, the yaw moment reducing means is operated in at least the second phase of the countersteering period, to reduce the yaw moment to be given to the vehicle by the yaw moment control mechanism. Namely, the yaw moment to be given to the vehicle in the second phase of the countersteering period is smaller than that to be given in the normal target follow-up control mode at the other opportunities during the vehicle turning, whereby the yaw moment to be given to the vehicle when the actual yaw rate is zeroed is minimized. Thus, the present vehicle attitude control device facilitates rapid stabilization of the vehicle attitude in the terminal portion of the countersteering period or state of the steering wheel.

It will be apparent from the above explanation that the present vehicle attitude control device is adapted to minimize the yaw moment to be given to the vehicle, which yaw moment would increase the actual yaw rate, after the actual yaw rate has been reduced to a value sufficiently close to zero during the countersteering period.

According to a first preferred form of the present invention, the controller controls the yaw moment control mechanism in one of the normal target follow-up control mode and a yaw rate responsive control mode in which the yaw moment control mechanism is controlled on the basis of the actual value of the yaw rate detected by the yaw rate sensor such that the actual value of the yaw rate is reduced toward zero, and the yaw moment reducing means includes control mode selecting means for commanding the controller to control the yaw moment control mechanism in the yaw rate responsive control mode in at least the second phase of the countersteering period, and in the normal target follow-up control mode at the other opportunities during the turning of the vehicle.

In the above first preferred form of the vehicle attitude control device, the control mode selecting means of the yaw moment reducing means commands the controller to control the yaw moment control mechanism in the yaw rate responsive control mode rather than in the normal target follow-up control mode, at least during the second phase of the countersteering period. In the yaw rate responsive control mode, the yaw moment to be given to the vehicle by the yaw moment control mechanism is controlled on the basis of the actual yaw rate so that the actual yaw rate is zeroed. In this form of the invention, substantially no yaw moment is given to the vehicle when the actual yaw moment is zero. Thus, the present arrangement would not cause the yaw moment control mechanism to give an unnecessary yaw moment to the vehicle even when the rotation angle of the steering wheel is not zero, as long as the actual yaw rate is zero, whereby the vehicle attitude can be rapidly stabilized in the terminal portion of the countersteering period.

The vehicle attitude control device according to the present invention may be adapted to substantially inhibit the operation of the yaw moment control mechanism in at least the second phase of the countersteering period, so that the yaw moment to be given to the vehicle in the second phase of the countersteering period is reduced as compared with that in the normal target follow-up control mode. However, the vehicle attitude control device according to this form of the invention is not capable of positively controlling the vehicle attitude when an external yaw moment acts on the vehicle due to an external disturbance, such as a wind in the lateral direction of the vehicle or a difference between friction coefficient values of right and left areas of the road surface on which the right and left wheels of the vehicle lie, respectively.

In the above-indicated first preferred form of the invention wherein the yaw moment control mechanism is controlled in the yaw rate responsive control mode in at least second phase of the countersteering period, the the vehicle attitude is positively controlled on the basis of the actual yaw rate of the vehicle while at the same time the vehicle attitude is stabilized, in the terminal portion of the countersteering period, whereby the safety of running of the vehicle is improved.

According to one advantageous arrangement of the above first preferred form of the vehicle attitude control device, the controller is adapted to effect proportioning control of the yaw moment control mechanism in the yaw rate responsive control mode, such that the yaw moment to be given to the vehicle by the yaw moment control mechanism is changed by an amount proportional to the actual value of the yaw rate detected by the yaw rate sensor, so as to reduce the actual value of the yaw rate toward zero. In this arrangement, the control mode selecting means commands the controller to effect the proportioning control of the yaw moment control mechanism in at least the second phase of the countersteering period.

According to a second preferred form of the present invention, the vehicle attitude control device further comprises a vehicle speed sensor for detecting a running speed of the vehicle, and the controller determines the target value of the yaw rate of the vehicle on the basis of the rotation angle of the steering wheel detected by the steering wheel angle sensor and the running speed of the vehicle detected by the vehicle speed sensor such that the determined target value of the yaw rate is expected to be established when the vehicle is turning along a circular arc path with the running speed being held substantially constant. The controller is adapted to control the yaw moment control mechanism in the normal target follow-up control mode such that the actual value of the yaw rate detected by the yaw rate sensor coincides with the determined target value.

According to a third preferred form of the present invention, the yaw moment reducing means comprises response changing means for commanding the controller to determine the target value of the yaw rate on the basis of the rotation angle of the steering wheel with a higher response to the rotation angle in at least the second phase of the countersteering period than at the other opportunities during the turning of the vehicle. In this case, the yaw moment reducing means commands the controller to control the yaw moment control mechanism in at least the second phase of the countersteering period, in a modified target follow-up control mode in which the target value of the yaw rate is determined with the higher response to the rotation angle of the steering wheel.

In the above third preferred form of the invention, the response of the target yaw rate to the rotation angle of the steering wheel is increased in at least the second phase of the countersteering period so that the yaw moment control mechanism is controlled in the modified target follow-up control mode such that the target yaw rate is changed with the higher response to a change in the rotation angle of the steering wheel. This arrangement is more effective to reduce the yaw moment of the vehicle when the rotation angle of the steering wheel is close to zero, that is, more effective to reduce the yaw moment that prevents the stabilization of the vehicle attitude in the terminal portion of the countersteering period, than the conventional attitude control arrangement as disclosed in the publication JP-A-6-270828 in which the time constant τ is increased to reduce the response of the target yaw rate to the rotation angle of the steering wheel when the steering which has been rotated in one direction is rotated in the reverse direction, namely, during the countersteering period.

In one advantageous arrangement of the above third preferred form of the invention, the yaw moment reducing means commands the controller to determine the target value of the yaw rate in a first-order time lag control system whose input is the rotation angle of the steering wheel and whose output is the target value of the yaw rate. In this case, the response changing means includes time constant changing means for changing a time constant τ used in a transfer function describing the first-order time lag control system such that the time constant is smaller in the modified target follow-up control mode than in the normal target follow-up control mode.

In the above advantageous arrangement wherein the time constant τ is made smaller in the modified target follow-up control mode than in the normal target follow-up control mode, the target yaw rate is reduced toward zero in quick response to a decrease in the rotation angle of the steering wheel toward zero, whereby the yaw moment of the vehicle that prevents the stabilization of the vehicle attitude in the terminal portion of the countersteering period can be more effectively reduced, than in the conventional arrangement in which the time constant is increased during the countersteering period.

According to a fourth preferred form of the present invention, the yaw moment reducing means comprises second-phase countersteering control means for commanding the controller to control the yaw moment control mechanism in a second-phase countersteering control mode in the second phase of the countersteering period such that the yaw moment to be given to the vehicle is smaller in the second-phase countersteering control mode than in the normal target follow-up control mode.

The second-phase countersteering control mode established by the second-phase countersteering control means may be a mode in which the steering angle of the rear wheels of the vehicle is held at the current value, a mode in which the steering angle of the rear wheels is zeroed, or a mode in which the slip angle of the rear wheels is zeroed. The steering angle of the rear wheels is a physical value representative of the orientation of the rear wheels with respect to the longitudinal direction of the vehicle. On the other hand, the slip angle of the rear wheels is a physical value representative of the orientation of the rear wheels with respect to the running or turning direction of the vehicle.

In one advantageous arrangement of the above fourth preferred form of the invention, the yaw moment reducing means further comprises first-phase countersteering control means for commanding the controller to control the yaw moment control mechanism in a first-phase countersteering control mode in the first phase of the countersteering period such that the yaw moment to be given to the vehicle is smaller in the first-phase countersteering control mode than in said normal target follow-up control mode.

The first-phase countersteering control mode established by the first-phase countersteering control means may be any one of the modes indicated above with respect to the second-phase countersteering control mode.

According to a fifth preferred form of this invention, the yaw moment reducing means comprises steering state determining means for determining whether the steering wheel is in the first phase or the second phase of the countersteering period, on the basis of a relationship between the rotation angle of the steering wheel and the actual value of the yaw rate.

For instance, the steering state determining means may be adapted to determine that the steering wheel is in the first phase of the countersteering period, if the rotation angle of the steering wheel is changed at a rate higher than a predetermined value while the actual value of the yaw rate is reduced toward zero at a rate lower than a predetermined value, and determine that the steering wheel is in the second phase of the countersteering period, if the rate of change of the rotation angle of the steering wheel becomes lower than a predetermined value after the steering state determining means has determined that the steering wheel is in the first phase.

According to a sixth preferred form of this invention, the yaw moment control mechanism controls the yaw moment to be given to the vehicle, by controlling a lateral force which is produced between at least one of the front wheels and rear wheels of the vehicle and a road surface on which the vehicle is running. The lateral force is a force which acts in the lateral direction of the vehicle. The yaw moment control mechanism may include a steering actuator for controlling the steering angle of the front and rear wheels and/or the steering angle of the rear wheels, to thereby control said lateral force. For instance, the steering actuator controls the steering angle of the rear wheels.

Alternatively, the yaw moment control mechanism may be adapted to control the yaw moment to be given to the vehicle, by controlling a difference between a longitudinal force between at least one of the right wheels and the road surface and a longitudinal force between at least one of the left wheels and the road surface. The longitudinal forces act in the longitudinal direction of the vehicle. For instance, the yaw moment control mechanism may include a torque control mechanism for controlling the above-indicated difference by controlling at least one of a driving torque and a braking torque to be applied to the right and left wheels. The torque control mechanism may include a pressure control mechanism for regulating pressures in brake cylinders for braking the right and left wheels, to thereby control a difference between the braking torques to be applied to the right and left wheels.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which:

FIG. 6 is a view for explaining various modes established in the countersteering determination routine;

FIG. 7 is a graph for explaining a principle of the countersteering determination in the routine of FIGS. 3 and 4;

FIG. 8 is a view indicating different control modes used in normal and countersteering states of the vehicle according to the rear steering angle control routine of FIG. 5;

FIG. 12 is a graph for explaining changes in the steering wheel angle and the actual yaw rate of the vehicle in the countersteering state of the vehicle;

DETAILED DESCRIPTION OF THE PREFERED EMBODIMENT

Figure 1:
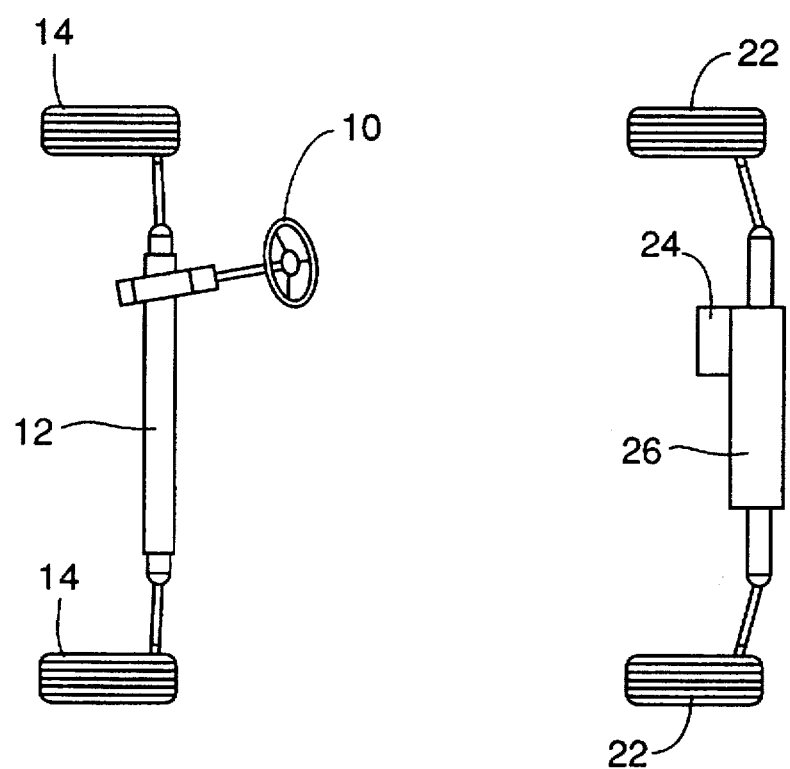
FIG. 1 is a plan view of a wheel steering system of a 4-wheel motor vehicle equipped with a vehicle attitude control device constructed according to one embodiment of the present invention.

The vehicle attitude control device according to one embodiment of this invention which will be described by reference to the accompanying drawings. This vehicle attitude control device is provided on a 4-wheel motor vehicle in which a steering wheel 10 which is manipulated by the vehicle operator is operatively connected to front right and left wheels 14 through a power-assisted front steering mechanism 12, as shown in FIG. 1. A steering angle $\theta_f$ of the front wheels 14 (hereinafter referred to as "front steering angle $\theta_f$") is mechanically changed depending upon a rotation angle $\theta_s$ of the steering wheel 10 (hereinafter referred to as "steering wheel angle $\theta_s$"). Rear wheels 22 are linked with a rear steering mechanism 26 which is provided with a rear steering actuator 24. As described below, the rear steering mechanism 26 is electrically controlled to change a steering angle $\theta_r$ of the rear wheels 22 (hereinafter referred to as "rear steering angle $\theta_r$"). The rear steering actuator 24 is driven by a suitable drive source such as a hydraulic pressure source or an electric motor. The front wheels 14 are non-drive or idler wheels, while the rear wheels 22 are drive wheels driven by an engine of the vehicle.

Figure 2:
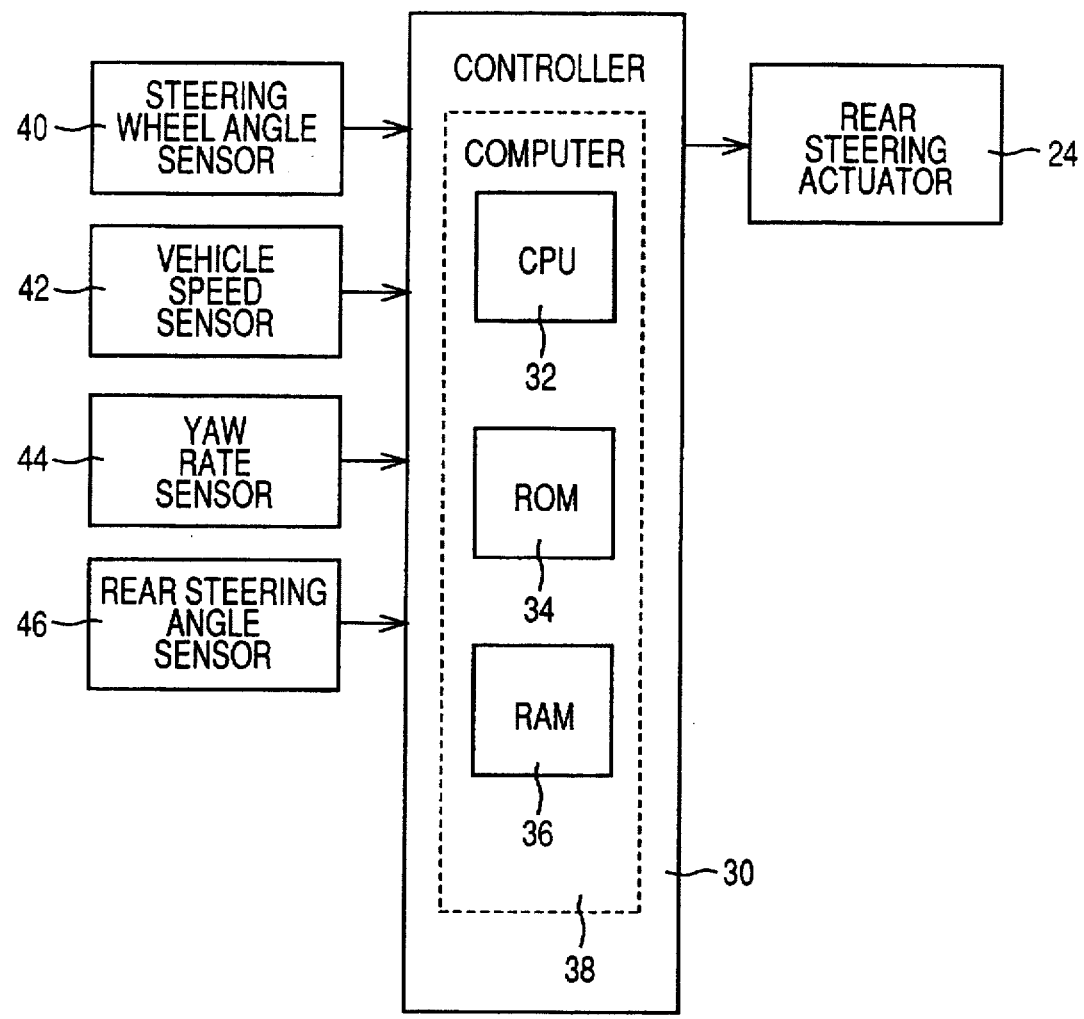
FIG. 2 is a block diagram illustrating an electrical arrangement of the vehicle attitude control device.

The vehicle attitude control device includes a controller 30 as shown in the block diagram of FIG. 2. The controller 30 is principally constituted by a computer 38 which incorporates a central processing unit (CPU) 32, a read-only memory (ROM) 34 and a random-access memory (RAM) 36. The controller 30 is adapted to receive output signals of a steering wheel angle sensor 46, a vehicle speed sensor 42, a yaw rate sensor 44 and a rear steering angle sensor 46. The steering wheel angle sensor 46 detects the steering wheel angle $\theta_s$, namely, angle of rotation $\theta_s$ of the steering wheel 10 by the vehicle operator. The steering wheel angle $\theta_s$ is positive when the steering wheel 10 is rotated counterclockwise to turn the vehicle leftwards, and is negative when the steering wheel 10 is rotated clockwise to turn the vehicle rightwards. The vehicle speed sensor 42 detects the running speed V of the vehicle. The yaw rate sensor 44 detects an actual yaw rate γ of the vehicle. The actual yaw rate γ is positive when the vehicle is turned leftwards, and is negative when the vehicle is turned rightwards. The rear steering angle sensor 46 detects the rear steering angle $\theta_r$, namely, steering angle $\theta_r$ of the rear wheels 22. The controller 30 is adapted to apply a control signal to the rear steering actuator 24 of the rear steering mechanism 26, to control this actuator 24 as described below in detail.

Figure 3:
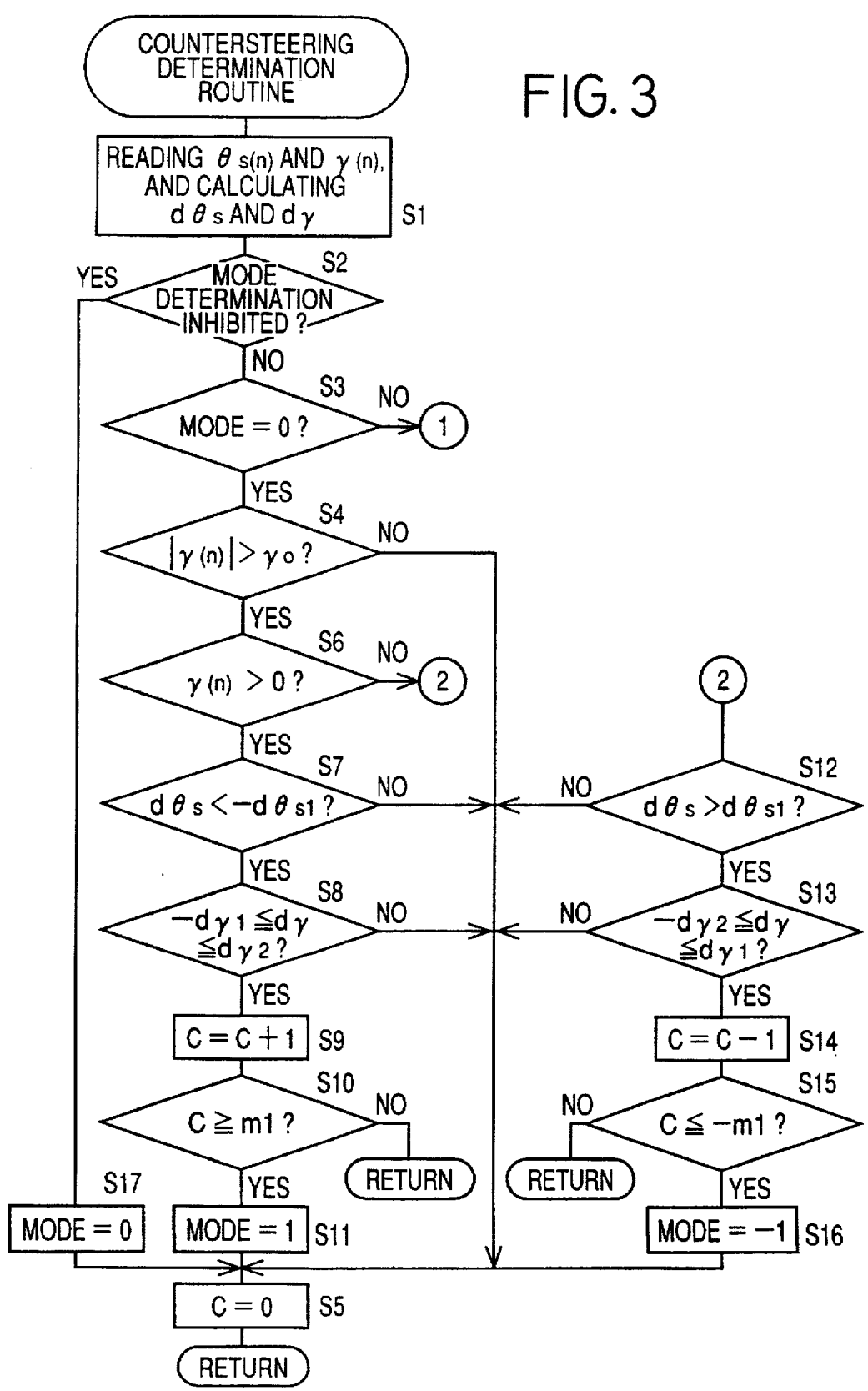
FIG. 3 is a flow chart illustrating a part of a countersteering determination routine according to a control program stored in a ROM of a controller shown in FIG. 2.
Figure 4:
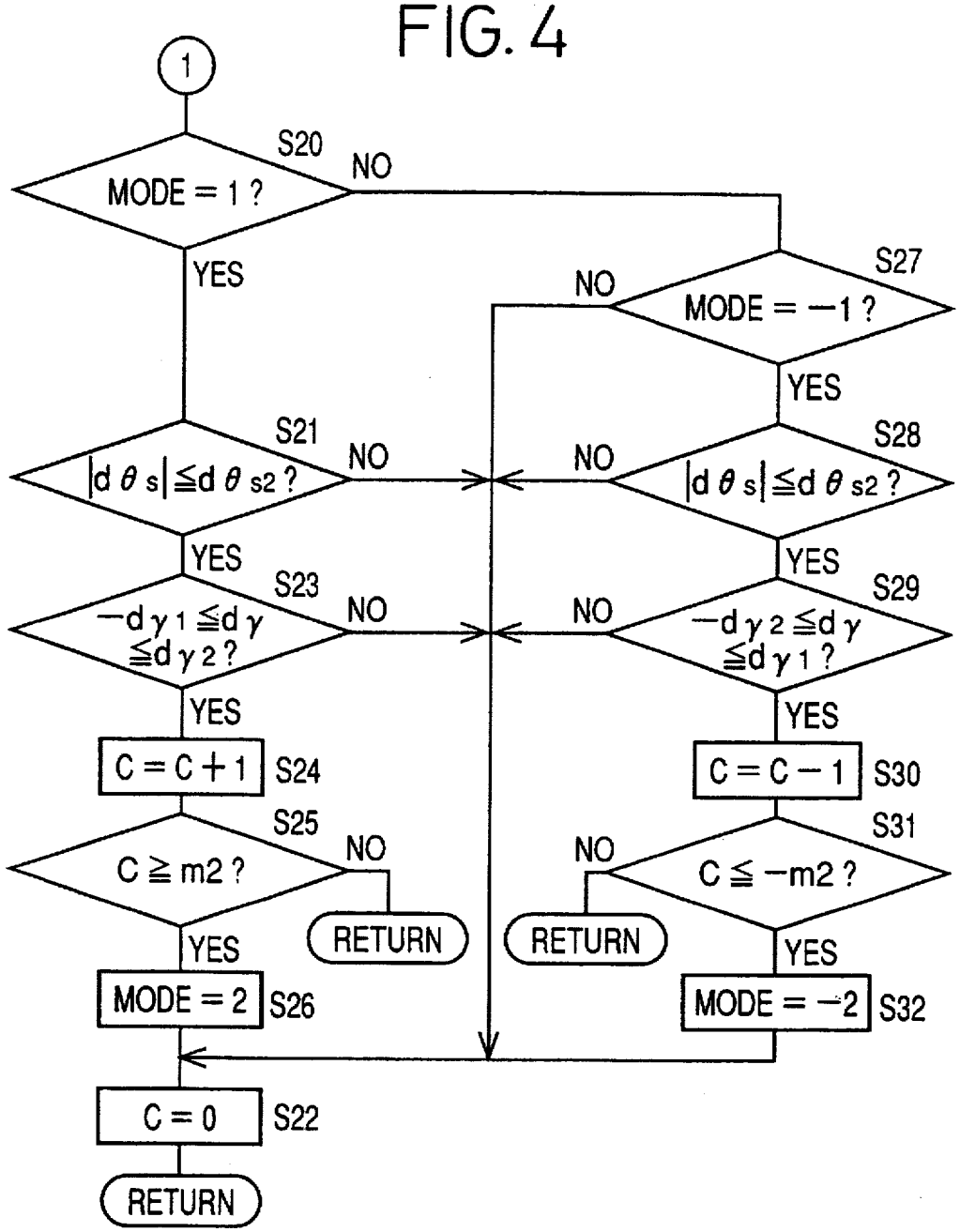
FIG. 4 is a flow chart illustrating the other part of the countersteering determination routine.
Figure 5:
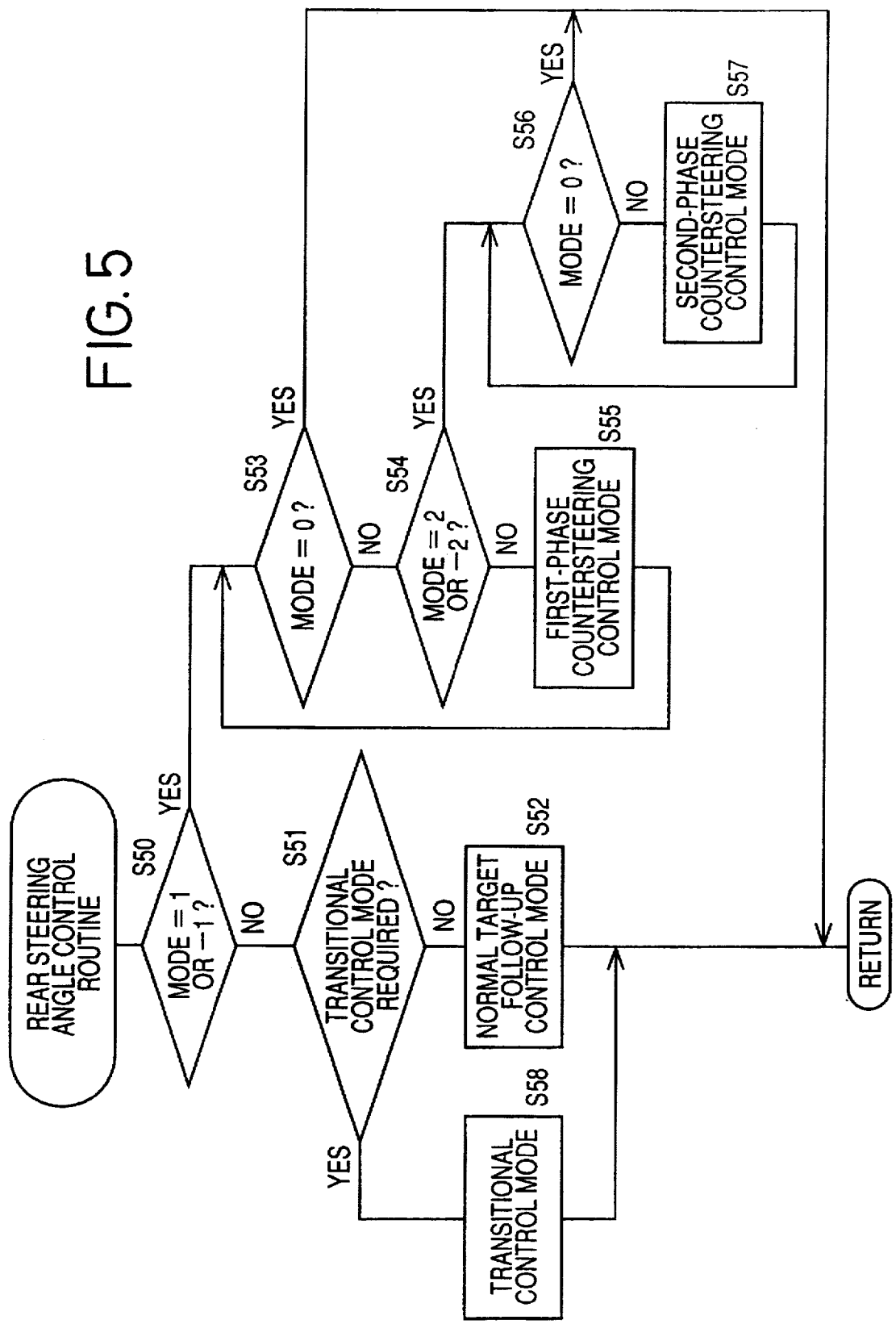
FIG. 5 is a flow chart illustrating a rear steering angle control routine according to a control program also stored in the ROM of the controller of FIG. 2.

The ROM 34 stores various control programs such as control programs for executing a countersteering determination routine illustrated in the flow charts of FIGS. 3 and 4 and a rear steering angle control routine illustrated in the flow chart of FIG. 5. The CPU 32 operates to execute these routines according to the appropriate control programs while utilizing a temporary data storage function of the RAM 36, for controlling the rear steering actuator 24 to control the rear steering angle $\theta_r$. These countersteering determination routine and the rear steering angle control routine will be described in this order.

Figure 14A:
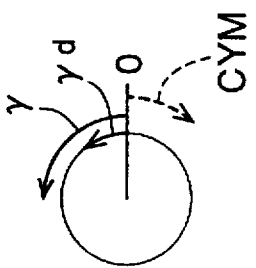
FIGS. 14A, 14B, 14C, 14D, 14E and 14F are views for explaining a problem conventionally encountered when the rear steering angle is controlled according to a target value in the countersteering state of the vehicle.
Figure 14B:
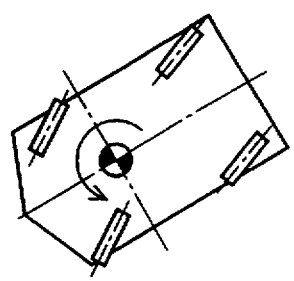
Figure 14C:
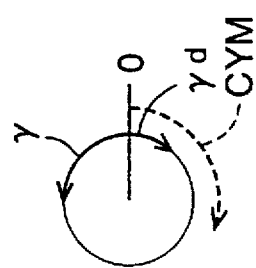
Figure 14D:
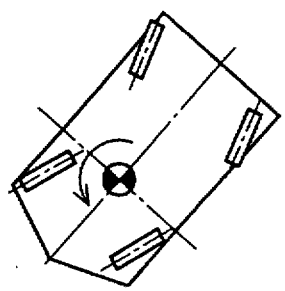
Figure 14E:
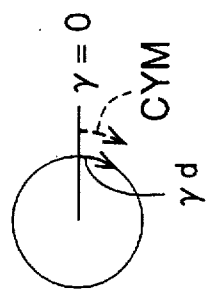
Figure 14F:
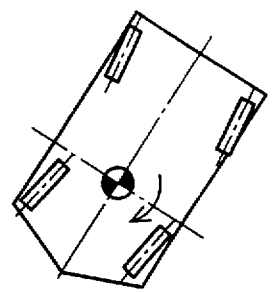

The countersteering determination routine of FIGS. 3 and 4 is provided to determine whether the steering wheel 10 is in a normal operating state or in a countersteering state, depending upon a relationship between the steering wheel angle $\theta_s$ and the actual yaw rate $\gamma$ of the vehicle. The meaning of the term "countersteering" will be understood by reading the "Discussion of the Related Art". A countersteering period during which the steering wheel 10 is placed in the countersteering state consists of a first or former phase and a second or latter phase. The countersteering determination routine is further formulated to determine whether the steering wheel 10 is in the first phase or in the second phase. The first phase is a phase in which the steering wheel 14 is rotated in one direction at a higher rate than in the normal operating state so that the front wheels 14 are oriented outwardly of the vehicle turning direction as indicated in FIGS. 14C and 14D. In the specific example of FIGS. 14A–14E, the steering wheel 10 is rapidly rotated in the clockwise direction during counterclockwise turning of the vehicle so that the front steering wheels 14 are oriented outwardly of the counterclockwise turning direction of the vehicle. Namely, the steering wheel angle $\theta_s$ is changed from a positive value (for counterclockwise turning of the vehicle) to a negative value (for clockwise turning of the vehicle) in the first phase of the countersteering period, as indicated by solid line in FIG. 12. In the second phase of the countersteering period, the steering wheel 10 is held substantially steady at an angular position close to the position at the end of the first phase, and is then rotated to its neutral position, as also indicated by the solid line in FIG. 12.

Described more specifically referring to FIG. 6, the countersteering determination routine is formulated to determine which one of five steering modes is currently established, depending upon the detected steering wheel angle $\theta_s$ and actual yaw rate $\gamma$ of the vehicle. The five steering modes consist of MODE –2, MODE –1, MODE 0, MODE 1 and MODE 2, as indicated in the table of FIG. 6.

The MODE 0 is established in the normal operating state of the steering wheel 10 in which the vehicle is running straight forward or turning with the vehicle tires stably gripping the road surface without slipping therebetween.

The MODE 1 and MODE 2 are established in the countersteering state of the steering wheel 10 while the vehicle is turning in the counterclockwise (CCW) direction with the actual yaw rate $\gamma$ being held positive. The MODE 1 is established in the first phase while the MODE 2 is established in the second phase.

The MODE –1 and MODE –2 are established in the countersteering state of the steering wheel 10 while the vehicle is turning in the clockwise (CW) direction with the actual yaw rate $\gamma$ being held negative. The MODE –1 is established in the first phase while the MODE –2 is established in the second phase.

The countersteering determination routine is formulated to determine the steering state of the steering wheel 10 on the following principle:

In the first phase of the countersteering period (countersteering state) following the gripping period (normal steering state), the steering wheel angle $\theta_s$ rapidly changes in the negative direction while on the other hand the actual yaw rate $\gamma$ only slowly changes toward zero in the negative direction, as indicated in FIG. 12. In an initial portion of the second phase of the countersteering period, the steering wheel angle $\theta_s$ is held substantially constant or slowly increases toward zero, while the rate of decrease of the actual yaw rate $\gamma$ is still low. In a terminal portion of the second phase of the countersteering period, the actual yaw rate $\gamma$ is held smaller than a given threshold value which is close to zero. The steering wheel angle $\theta_s$ and the actual yaw rate $\gamma$ generally have the relationship described above.

Based on this relationship between the steering wheel angle $\theta_s$ and the actual yaw rate $\gamma$, the countersteering determination routine is formulated to determine that the actual yaw rate $\gamma$ is slowly decreasing toward zero, if a time derivative d$\gamma$ of the actual yaw rate $\gamma$ (i.e., a rate of change d$\gamma$ of the actual yaw rate $\gamma$) is held within a range between –d$\gamma$1 and d$\gamma$2, where the actual yaw rate q is a positive value (during counterclockwise turning of the vehicle), as indicated in FIG. 7. The values d$\gamma$1 and d$\gamma$2 are both positive, and the value d$\gamma$1 is larger than the value d$\gamma$2. The above range includes the lower and upper limits –d$\gamma$1 and d$\gamma$2. Where the actual yaw rate $\gamma$ is a negative value (during clockwise turning of the vehicle), the countersteering determination routine determines that the actual yaw rate $\gamma$ is slowly decreasing toward zero, if the derivative d$\gamma$is held within a range between –d$\gamma$2 and d$\gamma$1, which range includes the lower and upper limits –d$\gamma$2 and d$\gamma$1, as also indicated in FIG. 7.

The countersteering determination routine is formulated to determine that the steering wheel angle $\theta_s$ is rapidly changing, if a time derivative d$\theta_s$ of the steering wheel angle $\theta_s$ (i.e., a rate of change d$\theta_s$ of the angle $\theta_s$) is smaller than $-d\theta_{s1}$, where the actual yaw rate q is a positive value. The value $d\theta_{s1}$ is a positive value. Where the actual yaw rate $\gamma$ is a negative value, the routine determines that the steering wheel angle $\theta$s is rapidly changing, if the derivative d$\theta_s$ is larger than $d\theta_{s1}$. The routine is also formulated to determine that the steering wheel angle $\theta_s$ is held substantially constant, if the absolute value of the derivative d$\theta_s$ is equal to or smaller than $d\theta_{s2}$, irrespective of whether the actual yaw rate $\gamma$ is positive or negative. The value $d\theta_{s2}$ is also a positive value and is smaller than the value $d\theta_{s1}$.

Thus, the countersteering determination routine is formulated to determine that the MODE 1 is currently established (i.e., the steering wheel 10 is in the first phase of the countersteering period during counterclockwise turning of the vehicle), if the derivative d$\theta_s$ is smaller than $-d\theta_{s1}$ and if the derivative d$\gamma$ is held within the range between –d$\gamma$1 and d$\gamma$2, as indicated in FIG. 7. The routine is further formulated to determine that the MODE 2 is currently established (i.e., the steering wheel 10 is in the second phase of the countersteering period during counter clockwise turning of the vehicle), if the absolute value of the derivative d$\theta_s$ is equal to or smaller than $d\theta_{s2}$ and if the derivative d$\gamma$ is held within the range between –d$\gamma$1 and d$\gamma$2, as also indicated in FIG. 7. The routine is further formulated to determine that the MODE –1 is currently established (i.e., the steering wheel 10 is in the first phase of the countersteering period during clockwise turning of the vehicle), if the derivative d$\theta$s is larger than $d\theta_{s1}$ and if the derivative d$\gamma$ is held within the range between $-d\theta_2$ and $d\theta_1$, as indicated in FIG. 7. The routine is further formulated to determine that the MODE –2 is currently established (i.e., the steering wheel 10 is in the second phase of the countersteering period during clockwise turning of the vehicle), if the absolute value of the derivative $d\theta_s$ is equal to or smaller than $d\theta_{s2}$ and if the derivative $d\gamma$ is held within the range between $-d\gamma2$ and $d\gamma1$, as indicated in FIG. 7.

It is noted that the determination according to the countersteering determination routine is not made each time the derivatives $d\theta_s$ and $d\gamma$ are obtained from the instantaneously detected steering wheel angle $\theta_s$ and actual yaw rate $\gamma$, but is made at predetermined time intervals on the basis of average values of the derivatives $d\theta s$ and $d\gamma$ each of which is obtained from a plurality of values $\theta s$, $\gamma$ detected during a predetermined sampling period. This arrangement is effective to prevent erroneous determination of the steering mode due to an error of detection of the steering wheel angle $\theta_s$ and actual yaw rate $\gamma$.

The countersteering determination routine is also adapted to effect a first determination as to whether the absolute value of the actual yaw rate $\gamma$ is smaller than a predetermined threshold value $\gamma 3$ which is a positive value close to zero, and to effect a second determination as to whether an affirmative decision is obtained consecutively in the first determination more than a predetermined number of times. An affirmative decision if obtained in the second determination indicates that a countersteering manipulation of the steering wheel 10 is terminated. In this case, the determination of the steering mode is inhibited, and the steering mode is reset to the MODE 0. The routine is also formulated to determine whether the vehicle running speed V is smaller than a predetermined threshold V1 which is a positive value close to zero. If so, the determination of the steering mode is inhibited. In this respect, it is noted that a countersteering manipulation of the steering wheel 10 is rarely required or effected while the vehicle running speed V is sufficiently low or close to zero.

While the countersteering determination routine has been briefly described, it will be described in detail by reference to the flow charts of FIGS. 3 and 4.

This countersteering determination routine is executed with a predetermined cycle time. In each cycle of execution of the routine, step S1 is initially implemented to read the steering wheel angle $\theta_{s(n)}$ currently detected by the steering wheel angle sensor 40 and the actual yaw rate $\gamma$ currently detected by the yaw rate sensor 44, and calculate an average of the currently obtained time derivative value $d\theta_s$ and a predetermined number (k) of the already obtained time derivative values $d\theta_s$, and an average of the currently obtained time derivative value $d\gamma$ and the predetermined (k) number of the already obtained time derivative values $d\gamma$. The average of the time derivative values $d\theta_s$ of the steering wheel angle $\theta_s$ is is calculated according to the following equation:

$$(\theta_{s(n)} - \theta_{s(n-k)})/(k \cdot T)$$

The average of the time derivative values $d\gamma$ of the actual yaw rate $\gamma$ is calculated according to the following equation:

$$(\gamma_{(n)} - \gamma_{(n-k)})/(k \cdot T)$$

In the above equations, "T" represents the cycle time of the present routine, namely, a sampling time of the steering wheel angle $\theta_s$ and the actual yaw rate $\gamma$. The thus obtained average values will be hereinafter referred to simply as "derivative $d\theta_s$" and "derivative $d\gamma$".

Then, the control routine goes to step S2 to determine whether the determination of the steering mode should be inhibited or not, that is, determine whether the decision that the absolute value of the actual yaw rate $\gamma$ is smaller than the predetermined threshold $\gamma 3$ has been obtained consecutively more than the predetermined number of times, and whether the vehicle running speed V is smaller than the predetermined threshold V1. If an affirmative decision in either of these two determinations is obtained, an affirmative decision (YES) is obtained in step S2. In this case, the control flow goes to step S17 in which a steering mode flag is reset to "0" indicative of the MODE 0, and one cycle of execution of the routine is terminated. The steering mode flag is reset to "0" when the computer 38 is turned on. The content of this steering mode flag indicative of the currently selected or established steering mode is stored in the RAM 36.

A negative decision (NO) is obtained in step S2 if the absolute value of the actual yaw rate $\gamma$ increases and the affirmative decision that this absolute value is smaller than the predetermined threshold $\gamma 3$ is not obtained consecutively more than the predetermined number of times, and if the vehicle speed V becomes higher than the predetermined threshold V1, during repeated execution of the present routine (during repeated implementation of steps S1, S3 and S17). In this case, step S2 is followed by step S3.

Step S3 is provided to determine whether the currently established steering mode is the MODE 0 or not. If an affirmative decision (YES) is obtained in step S3, the control flow goes to step S4 to determine whether the absolute value of the currently detected actual yaw rate $\gamma_{(n)}$ is larger than a predetermined positive value $\gamma$ larger than zero. If this absolute value $|\gamma_{(n)}|$ is close to zero, it indicates that a countersteering manipulation of the steering wheel 10 is rarely required. If a negative decision (NO) is obtained, the control flow goes to step S5 to reset a counter C to "0", and one cycle of execution of the routine is terminated.

If the absolute value $|\gamma_{(n)}|$ of the currently detected actual yaw rate $\gamma_{(n)}$ becomes larger than the predetermined value $\gamma$ during repeated implementation of steps S1–S5, an affirmative decision (YES) is obtained in step S4, and the control flow goes to step S6 to determine whether the currently detected actual yaw rate $\gamma_{(n)}$ is a positive value.

Where the actual yaw rate $\gamma$ is positive, an affirmative decision (YES) is obtained in step S6, and step S7 is implemented to determine whether the derivative $d\theta s$ of the steering wheel angle $\theta_s$ is smaller than the predetermined lower limit $-d\theta_{s1}$, namely, whether the steering wheel angle $\theta_s$ is rapidly changing or not. If a negative decision (NO) is obtained in step S7, one cycle of execution of the present routine is terminated after implementation of step S5. If an affirmative decision (YES) is obtained in step S7, the control flow goes to step S8 to determine whether the derivative $d\gamma$ is within the predetermined range between the lower limit $-d\gamma1$ and the upper limit $d\gamma2$, namely, whether the actual yaw rate $\gamma$ is slowly decreasing toward zero. If the derivative $d\gamma$ is not held within the predetermined range, a negative decision (NO) is obtained in step S8, and one cycle of execution of this routine is terminated after implementation of step S5. If the derivative $d\gamma$ is within the predetermined range, an affirmative decision (YES) is obtained in step S8, and the control flow goes to step S9 to increment the counter C, and to step S10 to determine whether the content of the counter C is equal to or larger than a predetermined value m1. If a negative decision (NO) is obtained in step S10, one cycle of execution of the routine is terminated.

An affirmative decision (YES) is obtained in step S10 if the content of the counter C has increased to the predetermined value m1 during repeated implementation of steps S1–S4 and S6–S10. In this case, step S11 is implemented to set the steering mode flag to "1" indicative of the MODE 1, that is, establish the MODE 1 since the steering wheel 10 is estimated to be in the first phase of the countersteering period as a result of countersteering manipulation of the steering wheel 10 by the vehicle operator during counterclockwise turning of the vehicle. Step S5 is then implemented to reset the counter C to zero, and one cycle execution of the routine is terminated.

Where the actual yaw rate $\gamma$ is negative, steps S12–S16 are implemented in a manner similar to that where the actual yaw rate $\gamma$ is positive.

Initially, step S12 is implemented to determine whether the derivative $d\theta_s$ of the steering wheel angle $\theta_s$ is larger than the predetermined upper limit $d\theta_{s1}$. If a negative decision (NO) is obtained in step S12, one cycle of execution of the present routine is terminated after implementation of step S5. If an affirmative decision (YES) is obtained in step S12, the control flow goes to step S13 to determine whether the derivative $d\gamma$ is within the predetermined range between the lower limit $-d\gamma2$ and the upper limit $d\gamma1$. If the derivative $d\gamma$ is not held within the predetermined range, a negative decision (NO) is obtained in step S13, and one cycle of execution of this routine is terminated after implementation of step S5. If the derivative $d\gamma$ is within the predetermined range, an affirmative decision (YES) is obtained in step S13, and the control flow goes to step S14 to decrement the counter C, and to step S15 to determine whether the content of the counter C is equal to or smaller than a predetermined value $-m1$. If a negative decision (NO) is obtained in step S115, one cycle of execution of the routine is terminated.

If an affirmative decision (YES) is obtained in step S15, step S16 is implemented to set the steering mode flag to "$-1$" indicative of the MODE 1, that is, establish the MODE 1 since the steering wheel 10 is estimated to be in the first phase of the countersteering period as a result of countersteering manipulation of the steering wheel 10 by the vehicle operator during clockwise turning of the vehicle. Step S5 is then implemented to reset the counter C to zero, and one cycle execution of the routine is terminated.

While a change of the steering mode from the MODE 0 to the MODE 1 or MODE $-1$ has been described above, there will be described a change from the MODE 1 or MODE $-1$ to the MODE 2 or MODE $-2$.

When the MODE 1 or MODE $-1$ is currently established, the negative decision (NO) is obtained in step S3, and the control flow goes to step S20 of the flow chart of FIG. 4 to determine whether the MODE 1 is currently established.

When the MODE 1 is currently established, an affirmative decision (YES) is obtained in step S20, and the control flow goes to step S21 to determine whether the absolute value $|d\theta_s|$ of the derivative $d\theta_s$ of the wheel steering angle $\theta_s$ is equal to or smaller than the predetermined value $d\theta_{s2}$, namely, whether the wheel steering angle $\theta_s$ is held substantially constant. If a negative decision (NO) is obtained in step S21, step S22 is implemented to reset the counter C to "0", and one cycle of execution of the routine is terminated. If an affirmative decision (YES) is obtained in step S21, the control flow goes to step S23 to determine whether the derivative $d\gamma$ of the actual yaw rate $\gamma$ is held within the range between the lower limit $-d\gamma1$ and the upper limit $d\gamma2$. If a negative decision (NO) is obtained in step S23, one cycle of execution of the routine is terminated after implementation of step S22. If an affirmative decision (YES) is obtained in step S23, the control flow goes to step S24 to increment the counter C, and step S25 to determine whether the content of the counter C is equal to or larger than a predetermined value m2. If a negative decision (NO) is obtained in step S25, one cycle of execution of the routine is terminated.

An affirmative decision (YES) is obtained in step S25 when the content of the counter C becomes equal to the predetermined value m2. In this case, the control flow goes to step S26 to set the steering mode flag to "2" indicative of the MODE 2, that is, establish the MODE 2 since the steering wheel 10 is estimated to be in the second phase of the countersteering period as a result of countersteering manipulation of the steering wheel 10 by the vehicle operator during counterclockwise turning of the vehicle. Step S22 is then implemented to reset the counter C to zero, and one cycle execution of the routine is terminated.

When the MODE 1 is not currently established, a negative decision (NO) is obtained in step S20, and the control flow goes to step S27 to determine whether the MODE $-1$ is currently established. If the MODE $-1$ is established and an affirmative decision (YES) is obtained, steps S28–S32 are implemented in a manner similar to that where the MODE 1 is currently established.

Step S28 is implemented to determine whether the absolute value $|d\theta_s|$ of the derivative $d\theta_s$ of the wheel steering angle $\theta_s$ is equal to or smaller than the predetermined value $d\theta_{s2}$. If a negative decision (NO) is obtained in step S28, step S22 is implemented to reset the counter C to "0", and one cycle of execution of the routine is terminated. If an affirmative decision (YES) is obtained in step S28, the control flow goes to step S29 to determine whether the derivative $d\gamma$ is held within the range between the lower limit $-d\gamma2$ and the upper limit $d\gamma1$. If a negative decision (NO) is obtained in step S29, one cycle of execution of the routine is terminated after implementation of step S22. If an affirmative decision (YES) is obtained in step S29, the control flow goes to step S30 to decrement the counter C, and step S31 to determine whether the content of the counter C is equal to or smaller than a predetermined value $-m2$. If a negative decision (NO) is obtained in step S31, one cycle of execution of the routine is terminated.

An affirmative decision (YES) is obtained in step S31 when the content of the counter C becomes equal to the predetermined value $-m2$. In this case, the control flow goes to step S32 to set the steering mode flag to "$-2$" indicative of the MODE $-2$, that is, establish the MODE $-2$ since the steering wheel 10 is estimated to be in the second phase of the countersteering period as a result of countersteering manipulation of the steering wheel 10 by the vehicle operator during clockwise turning of the vehicle. Step S22 is then implemented to reset the counter C to zero, and one cycle execution of the routine is terminated.

When the MODE 2 is currently established, the negative decision (NO) is obtained in steps S3, S20 and S27, and step S22 is implemented to reset the counter C to "0", and one cycle of execution of the routine is terminated. When the countersteering manipulation of the steering wheel 10 is terminated, the affirmative decision (YES) is obtained in step S2, and the steering mode flag is reset to "0" in step S17.

The rear steering angle control routine will be described next by reference to the flow chart of FIG. 5.

The rear steering angle control routine is formulated to control the rear steering actuator 24 in a normal target follow-up control mode when the steering wheel 10 is in the normal steering state. This routine is further formulated to control the rear steering actuator 24 in a first-phase countersteering control mode and a second-phase countersteering control mode when the steering wheel 10 is in the first and second phases of the countersteering period, respectively. The table of FIG. 8 shows a change of the control mode of the rear steering actuator 24 from the normal target follow-up control mode to the first-phase and second-phase countersteering control modes, and a change from these countersteering control modes to back the normal target follow-up control mode.

In the normal target follow-up control mode, a target value $\theta_{rd}$ of the rear steering angle $\theta_r$ is determined according to the following equation, for example:

$$\theta_{rd} = K1(V) \cdot (\gamma - \gamma d)$$

The rear steering actuator 24 is controlled by the controller 30 so as to establish the actual rear steering angle $\theta_r$ coincides with the target value $\theta_{rd}$.

Figure 9:
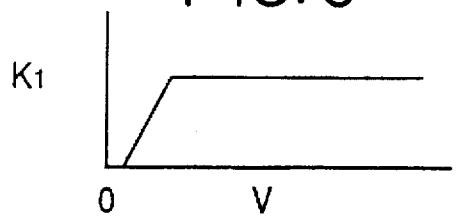
FIG. 9 is a graph indicating an example of a relationship between a yaw rate error proportioning gain K1 and a vehicle running speed V, which relationship is used for calculating a target rear steering wheel angle in the rear steering angle control routine of FIG. 5.

In the above equation, "K1" is a proportioning gain which changes depending upon the vehicle running speed V, as indicated in the graph of FIG. 9, by way of example. "$\gamma$" and "$\gamma d$" represent the actual yaw rate and the target yaw rate, respectively.

The target yaw rate $\gamma\gamma$ is calculated on the basis of the vehicle running speed V and the steering wheel angle $\theta_s$, such that the calculated target yaw rate $\gamma$ is expected to be established when the vehicle is turning along a circular arc path at a substantially constant speed. For instance, the target yaw rate $\gamma_d$ is calculated based on an assumption that the response of the target yaw rate $\gamma d$ to a change in the steering wheel angle $\theta_s$ is represented by a transfer function expressed by:

$$G(V)/(\tau \cdot s + 1)$$

where,

G(V): target yaw rate gain

V: vehicle running speed $\tau$: time constant s: Laplace operator

Figure 10:
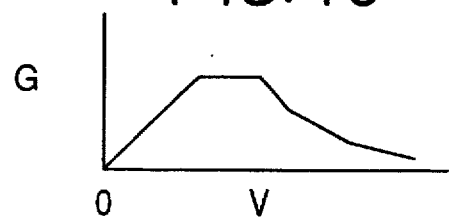
FIG. 10 is a graph indicating an example of a relationship between a target yaw rate gain G and the vehicle running speed V, which relationship is used for calculating a target yaw rate of the vehicle in the rear steering angle control routine of FIG. 5.

The target yaw rate gain G(V) changes depending upon the vehicle running speed V, as indicated in the graph of FIG. 10, by way of example.

In the normal target follow-up control mode described above, the rear steering actuator 24 is controlled according to a first-order time lag control system whose input is the steering wheel angle $\theta_s$, and whose output is the target yaw rate $\gamma d$ and wherein a time constant $\tau$ in the transfer function describing a first-order time lag is a fixed constant.

The first-phase and second-phase countersteering control modes will be explained.

In the first phase of the countersteering period, the vehicle operator rotates the steering wheel 10 at a relatively high rate although and while the actual yaw rate $\gamma$ of the vehicle is slowing decreasing toward zero. In this first phase, therefore, there is a risk that the rear wheels 22 are excessively steered with a result of reduction in the stability of the vehicle attitude, if the rear steering angle $\theta_r$ is changed according to the steering angle $\theta_s$ in the same manner as in the normal target follow-up control mode. To avoid such risk, the rear steering actuator 24 is controlled in the first-phase countersteering control mode according to a suitable one of a proportioning control, a rear steering angle holding control, a rear steering angle zeroing control and a rear wheel slip angle zeroing control, as indicated in FIG. 8. In the proportioning control, the rear steering actuator 24 is controlled such that the actual rear steering angle $\theta_r$ is proportional to the actual yaw rate $\gamma$. In the rear steering angle holding control, the actual rear steering angle $\theta_r$ is held constant. In the rear steering angle zeroing control, the actual rear steering angle $\theta_r$ is decreased toward zero. In the rear wheel slip angle zeroing control, an actual slip angle $\alpha_r$ of the rear wheels 22 is decreased toward zero.

In the proportioning control, the target rear steering angle $\theta_{rd}$ is calculated according to the following equation, for example:

$$\theta_{rd} = K2(V) \cdot \gamma$$

The rear steering actuator 24 is controlled so that the actual rear steering angle $\theta_r$ coincides with the target value $\theta_{rd}$.

Figure 11:
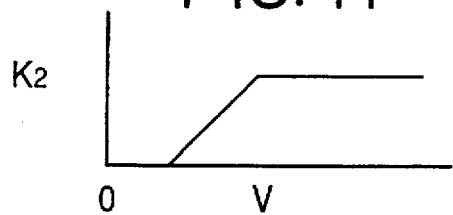
FIG. 11 is a graph indicating an example of a relationship between an actual yaw rate gain K2 and the vehicle running speed V, which relationship is used for calculating the target yaw rate of the vehicle in the rear steering angle control routine of FIG. 5.
Figure 13:
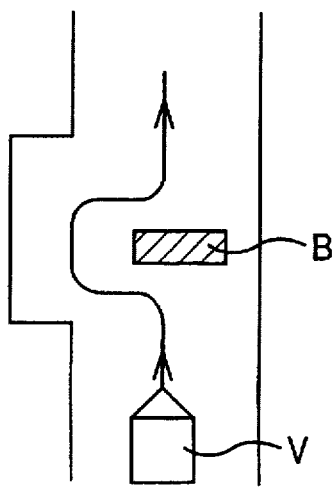
FIG. 13 is a plan view for explaining a steering test of the vehicle conducted to obtain the data of FIG. 12.

In the above equation, "K2" represents a proportioning gain which changes depending upon the vehicle running speed V, as indicated in the graph of FIG. 11, by way of example. "$\gamma$" in the same equation represents the actual yaw rate of the vehicle.

In the second phase of the countersteering period, the actual yaw rate $\gamma$ is slowly decreasing toward zero as in the first phase, but the force by which the vehicle tires grip the road surface is considered to have a higher tendency of increase than in the first phase. In an initial portion of the second phase, the vehicle operator holds the steering wheel 10 at a substantially constant angular position, and the actual yaw rate $\gamma$ tends to be zeroed in an terminal portion of the second phase, before the steering wheel angle $\theta_s$ is rapidly zeroed. If the rear steering angle $\theta r$ is changed according to the steering angle $\theta_s$ in the second phase of the countersteering period, the rear steering angle $\theta r$ will not be zeroed when the actual yaw rate $\gamma$ is zeroed, whereby the vehicle is undesirably given a yaw moment which prevents the zeroing of the actual yaw rate $\gamma$. To avoid such tendency, the rear steering actuator 24 is controlled in the second-phase countersteering control mode according to a suitable one of the proportioning control, rear steering angle zeroing control and rear wheel slip angle zeroing control, as indicated in FIG. 8.

The rear steering angle control routine of FIG. 5 is executed with a predetermined cycle time. The routine is initiated with step S50 to read the content of the steering mode flag stored in the RAM 36, and determine whether the MODE 1 or MODE −1 is currently established. If a negative decision (NO) is obtained in step S50, the control flow goes to step S51 to determine whether the rear steering actuator 24 should be controlled in a transitional control mode, which will be described. If a negative decision (NO) is obtained in step S51, the control flow goes to step S52 in which the rear steering actuator 24 is controlled in the normal target follow-up control mode, and one cycle of execution of the routine is terminated.

When the MODE 1 or MODE −1 is subsequently established, an affirmative decision (YES) is obtained in step S50, and step S53 is implemented to determine whether the steering mode is changed from the MODE 1 or MODE −1 to the MODE 0. If a negative decision (NO) is obtained in step S53, the control flow goes to step S54 to determine whether the MODE 2 or MODE −2 is currently established. If the MODE 1 or MODE −1 remains, a negative decision (NO) is obtained in step S54, and the control flow goes to step S55 to control the rear steering actuator 24 in the first-phase countersteering control mode described above.

When the normal target follow-up control mode is followed by the first-phase countersteering control mode, it is desirable to control the rear steering actuator 24 in a suitable transient control mode such that the rear steering angle $\theta_r$ changes toward the target value $\theta_{rd}$ at a predetermined constant rate until the difference between the actual rear steering angle $\theta_r$ and the target value $\theta_{rd}$ has been reduced to a predetermined value, for example. This transient control mode is desirably provided to prevent a rapid change of the vehicle attitude due to a rapid change of the rear steering angle $\theta_r$.

When the steering mode is changed to the MODE 0 during repeated implementation of steps S53–S55, an affirmative decision (YES) is obtained in step S53, and one cycle of execution of the routine is terminated. When the steering mode is changed to the MODE 2 or MODE −2, an affirmative decision (YES) is obtained in step S54, and the control flow goes to step S56 to determine whether the steering mode is subsequently changed to the MODE 0. If the MODE 2 or MODE −2 remains, a negative decision (NO) is obtained in step S56, and the control flow goes to step S57 to control the rear steering actuator 24 in the second-phase countersteering control mode. If the steering mode is subsequently changed to the MODE 0 during repeated implementation of steps S56 and S57, an affirmative decision (YES) is obtained in step S56, and one cycle of execution of the routine if terminated.

A negative decision (NO) is obtained in step S50 when the present routine is executed after the affirmative decision (YES) is obtained in step S53 (after the steering mode is changed from the MODE 1 or MODE −1 to the MODE 0) or in step S56 (after the steering mode is changed from the MODE 2 or MODE −2 to the MODE 0). In this case, the control flow goes to step S51 to determine whether the transitional control mode should be established. The "transitional control mode" is a control mode for permitting smooth transition of the steering mode from the first-phase or second-phase countersteering control mode back to the normal target follow-up control mode. In the transitional control mode, the rear steering angle $\theta_r$ is controlled so as to smoothly change from the actual value upon initiation of the transitional control mode to the target value which would be calculated if the countersteering control mode was followed by the normal target follow-up control mode. If an affirmative decision (YES) is obtained in step S51, the control flow goes to step S58 to control the rear steering actuator 24 in the transitional control mode, and one cycle of execution of the routine is terminated. If the negative decision (NO) is obtained in step S51, the control flow goes to step S52 to control the rear steering actuator 24 in the normal target follow-up control mode.

There will be described preferred specific combinations of controls in the first-phase and second-phase countersteering control modes and the transitional control mode.

Where the proportioning control is selected in the first-phase countersteering control mode, it is desirable to select the following types of controls in the second-phase countersteering control mode and the transitional control mode:

(1) Controls in the second-phase countersteering control mode 1-1. The proportioning control is continued.

1-2. The proportioning control is continued with a smaller value of the proportioning gain K2 than in the first-phase countersteering control mode.

1-3. The rear wheels 22 are steered toward their neutral position at a predetermined speed, and are held at the neutral position thereafter.

1-4. The rear wheels 22 are steered so as to establish one of the target rear steering angles to be calculated in the above cases 1-1 and 1-3, whose absolute value is smaller than the other.

1-5. The rear wheels 22 are steered so as to establish one of the target rear steering angles to be calculated in the above cases 1-2 and 1-3, whose absolute value is smaller than the other.

(2) Controls in the transitional control mode 2-1. The proportioning control is continued until the difference between the target rear steering angles to be calculated in the normal target follow-up control mode and the proportioning control has been reduced to a predetermined value, and the normal target follow-up control mode is established after the difference has been reduced to the predetermined value.

2-2. The rear wheels 22 are steered to the neutral position and held there until the target rear steering angle to be calculated in the normal target follow-up control mode has been reduced to a predetermined value, and the normal target follow-up control mode is established thereafter.

Where the rear steering angle holding control is selected in the first-phase countersteering control mode, it is desirable to select the following types of controls in the second-phase countersteering control mode and the transitional control mode:

(1) Controls in the second-phase countersteering control mode 1-1. The rear wheels 22 are steered toward their neutral position at a predetermined speed, and are held at the neutral position thereafter.

1-2. The rear wheels 22 are steered so as to establish one of the target rear steering angles to be calculated in the normal target follow-up control mode and in the above case 2-1, whose absolute value is smaller than the other.

(2) Controls in the transitional control mode 2-1. The rear wheels 22 are steered to the neutral position and held there until the target rear steering angle to be calculated in the normal target follow-up control mode has been reduced to a predetermined value, and the normal target follow-up control mode is established thereafter.

It will be understood from the foregoing explanation of the present embodiment of the vehicle attitude control device that the rear steering angle $\theta_r$ is controlled in the second phase of the countersteering period, so that after the actual yaw rate $\gamma$ has been reduced to zero the vehicle is prevented from being given a yaw moment that would increase the actual yaw rate $\gamma$ in the direction opposite to the direction in which the actual yaw rate $\gamma$ has been reduced to zero. Therefore, the present embodiment is effective to minimize instability of the vehicle attitude and assure improved steerability of the vehicle during the terminal portion of the countersteering period, more precisely, during the terminal portion of the second phase of the countersteering period.

In the present embodiment, the predetermined values such as $\gamma 0$, $d\gamma 1$, $d\gamma 2$ used in the countersteering determination routine of FIGS. 3 and 4 are constant values. However, these constants may be replaced by variables which decrease with a decrease in the friction coefficient $\mu$ of the road surface, for example, if the vehicle is provided with means for estimating the friction coefficient $\mu$. In this case, the accuracy of determination in the countersteering determination routine is improved and the stabilization of the vehicle attitude can be further improved during running of the vehicle on the road surface whose friction coefficient $\mu$ is relatively low and on which the countersteering manipulation of the steering wheel 10 takes place relatively frequently.

It will also be understood that the rear steering mechanism 26 including the rear steering actuator 24 constitutes an example of a yaw moment control mechanism adapted to control the yaw moment of the vehicle, and that a portion of the controller 20 assigned to execute the countersteering determination routine (S1–S32) of FIGS. 3 and 4 and implement steps S50, S51 and S53–S58 of the rear steering angle control routine of FIG. 5 cooperates with the steering wheel angle sensor 40 and the yaw rate sensor 44 to constitute an example of yaw moment reducing means operated in the second phase of the countersteering period, and control mode selecting means for selecting one of the normal target follow-up control mode and a yaw rate responsive control mode in which the rear steering actuator 24 is controlled depending upon the actual yaw rate of the vehicle.

While the present invention has been described above in detail in its presently preferred embodiment, it is to be understood that the invention may be embodied with various changes, modification and improvements, which may occur to those skilled in the art, without departing from the spirit and scope of the invention defined in the following claims.

What is claimed is:

1. A vehicle attitude control device comprising a steering wheel angle sensor for detecting a rotation angle of a steering wheel which is operated by an operator of the vehicle to steer front wheels of the vehicle, a yaw rate sensor for detecting an actual value of a yaw rate of the vehicle, a yaw moment control mechanism for giving a yaw moment to the vehicle and controlling said yaw moment, and a controller for controlling said yaw moment control mechanism in a normal target follow-up control mode so that the actual value of the yaw rate detected by said yaw rate sensor coincides with a target value of the yaw rate which is determined on the basis of the rotation angle of the steering wheel detected by said steering wheel angle sensor, wherein an improvement comprises yaw moment reducing means for reducing the yaw moment to be given to the vehicle by said yaw moment control mechanism, to a reduced value smaller than a normal value to which the yaw moment is controlled in said normal target follow-up control mode under the control of said controller, said yaw moment reducing means being operated in at least a second phase of a countersteering period following a first phase of said countersteering period, said countersteering period being initiated by countersteering manipulation of said steering wheel by said operator upon slipping of rear wheels of the vehicle during turning of the vehicle outwardly of a direction of said turning so as to countersteer the vehicle, said countersteering manipulation including a rotation of said steering wheel in said first phase so that said front wheels are oriented outwards with respect to said turning direction of the vehicle, and a rotation of said steering wheel toward a neutral position thereof in said second phase.

2. A vehicle attitude control device according to claim 1, wherein said controller controls said yaw moment control mechanism in one of said normal target follow-up control mode and a yaw rate responsive control mode in which said yaw moment control mechanism is controlled on the basis of said actual value of said yaw rate detected by said yaw rate sensor such that said actual value of the yaw rate is reduced toward zero, and wherein said yaw moment reducing means includes control mode selecting means for commanding said controller to control said yaw moment control mechanism in said yaw rate responsive control mode in at least said second phase of said countersteering period, and in said normal target follow-up control mode at the other opportunities during said turning of the vehicle.

3. A vehicle attitude control device according to claim 2, wherein said controller effects proportioning control of said yaw moment control mechanism in said yaw rate responsive control mode, such that the yaw moment to be given to the vehicle by said yaw moment control mechanism is changed by an amount proportional to said actual value of the yaw rate detected by said yaw rate sensor, so as to reduce said actual value of the yaw rate toward zero, and wherein said control mode selecting means commands said controller to effect said proportioning control of said yaw moment control mechanism in at least said second phase of said countersteering period.

4. A vehicle attitude control device according to claim 1, further comprising a vehicle speed sensor for detecting a running speed of the vehicle, and wherein said controller determines said target value of said yaw rate of the vehicle on the basis of said rotation angle of said steering wheel detected by said steering wheel angle sensor and said running speed of the vehicle detected by said vehicle speed sensor such that the determined target value of the yaw rate is expected to be established when the vehicle is turning along a circular arc path with said running speed being held substantially constant, said controller controlling said yaw moment control mechanism in said normal target follow-up control mode such that said actual value of the yaw rate detected by said yaw rate sensor coincides with said determined target value.

5. A vehicle attitude control device according to claim 1, wherein said yaw moment reducing means comprises second-phase countersteering control means for commanding said controller to control said yaw moment control mechanism in a second-phase countersteering control mode in said second phase of said countersteering period such that the yaw moment to be given to the vehicle is smaller in said second-phase countersteering control mode than in said normal target follow-up control mode.

6. A vehicle attitude control device according to claim 5, wherein said yaw moment reducing means further comprises first-phase countersteering control means for commanding said controller to control said yaw moment control mechanism in a first-phase countersteering control mode in said first phase of said countersteering period such that the yaw moment to be given to the vehicle is smaller in said first-phase countersteering control mode than in said normal target follow-up control mode.

7. A vehicle attitude control device according to claim 1, wherein said yaw moment reducing means comprises steering state determining means for determining whether said steering wheel is in said first phase or said second phase of said countersteering period, on the basis of a relationship between said rotation angle of said steering wheel and said actual value of said yaw rate.

8. A vehicle attitude control device according to claim 7, wherein said steering state determining means determines whether said steering wheel is in said first phase or said second phase, on the basis of a relationship between a rate of change of said rotation angle of said steering wheel and a rate of change of said actual value of said yaw rate.

9. A vehicle attitude control device according to claim 1, wherein said yaw moment control mechanism controls said yaw moment to be given to the vehicle, by controlling a lateral force which is produced between at least one of said front wheels and rear wheels of the vehicle and a road surface on which the vehicle is running, said lateral force acting in a lateral direction of the vehicle.

10. A vehicle attitude control device according to claim 9, wherein said yaw moment control mechanism includes a steering actuator for controlling a steering angle of at least one of said front and rear wheels, to thereby control said lateral force.

11. A vehicle attitude control device according to claim 10, wherein said steering actuator controls the steering angle of said rear wheels.

* * * * *